United States Patent [19]
Baker

[11] Patent Number: 5,946,355
[45] Date of Patent: Aug. 31, 1999

[54] SERIAL-DIGITAL RECEIVER

[75] Inventor: Daniel G. Baker, Beaverton, Oreg.

[73] Assignee: Tektronix, Inc., Wilsonville, Oreg.

[21] Appl. No.: 08/858,153

[22] Filed: Mar. 21, 1997

[51] Int. Cl.$^6$ .................................................. H04L 25/34
[52] U.S. Cl. ........................ 375/286; 375/289; 375/316; 341/56; 341/69
[58] Field of Search ..................... 375/256, 259, 375/285, 286, 289, 316, 340; 329/311; 341/56, 68, 69, 73, 94; 371/30, 48, 57.1

[56] References Cited

U.S. PATENT DOCUMENTS

| | | | |
|---|---|---|---|
| 4,470,081 | 9/1984 | Chi | 360/43 |
| 5,113,186 | 5/1992 | Remson | 341/68 |
| 5,280,500 | 1/1994 | Mazzola et al. | 375/286 |
| 5,282,032 | 1/1994 | Baker | 358/139 |
| 5,313,496 | 5/1994 | De Goede | 375/342 |
| 5,450,441 | 9/1995 | Harris et al. | 375/224 |
| 5,621,755 | 4/1997 | Bella et al. | 375/219 |

OTHER PUBLICATIONS

"Pathological Check Codes for Serial Digital Interface Systems" by Takeo Eguchi, SMPTE Journal, Aug. 1992, pp. 553–558.

*Primary Examiner*—Don N. Vo
*Attorney, Agent, or Firm*—Francis I. Gray

[57] ABSTRACT

An improved serial-digital data receiver that receives a scrambled NRZI voltage signal representing a transmitted serial-digital data signal converts the scrambled NRZI voltage signal in the analog domain to a bi-polar or pseudo-ternary voltage signal. The bi-polar voltage signal is then input to a slicer and clock recovery circuit to provide a recovered clock signal and a scrambled NRZ data signal in the digital domain. The scrambled NRZ data signal is then descrambled to recover the transmitted serial-digital data signal. Single bit error identification and limited correction may be included by using a sequential state machine decoder to generate an error flag and by using a "soft-decision" circuit to identify the probable bit error location. The probable bit error location is used to invert suspected bit errors, partially correcting the bit errors, and the error flag is used to control a switch that selects either the scrambled NRZ data signal or the partially corrected version of the scrambled NRZ data signal for descrambling.

29 Claims, 4 Drawing Sheets

SERIAL-DIGITAL RECEIVER

BACKGROUND OF THE INVENTION

The present invention relates to digital data receivers, and more particularly to an improved serial-digital receiver that improves clock recovery signal to noise ratio (S/N), eliminates the need for a DC restorer and detects single-bit errors.

Current serial-digital video transmitters use a scrambled NRZI (Non Return to Zero Inverted) channel coding that is directly converted to ECL voltage levels for transmission. The logic "1" and logic "0" values of the channel code are converted to +400 mv and −400 mv voltage levels and launched into the input of a 75 ohm coaxial cable that represents the channel. The scrambling is required to pseudo-randomize or decorrelate the serialized data bits or channel signal voltages so as to make them pseudo independent of the data-byte patterns that represent the video image.

For example, a flat-field image represents a repeated byte pattern that serializes into a fixed, repetitive sequence that could contain long strings of "1"s or "0"s. The scrambler is a feedback shift register to pseudo-randomize the sequence such that, even if the input to the scrambler is a long string of "1"s or "0"s, the output is a balanced sequence mixture of both. The design of these LFSR (Linear Feedback Shift Register) scramblers is well known to those of ordinary skill in the art.

However it is important to note that the characteristics of the scrambler are such that some video patterns are not sufficiently randomized in the current serial-digital video standard. These pathogenic patterns have been identified and are used for stress-testing today's serial-digital systems. They are known as pathological or Serial Digital Interface (SDI) test signals. Other, possibly more complicated, scramblers could be designed that would be insensitive to these stressful signals, but such scramblers would not likely be back-compatible with existing equipment.

The reasons for using a scrambler to eliminate these long strings of "1"s and "0"s are at least twofold. First, the serial data is preferred to be converted directly to an ECL channel voltage in a self-clocking NRZ format. Long strings of "1"s and "0"s reduce the channel voltage transitions to very few and far between so that clock recovery becomes difficult to impossible. Second, the system is preferably AC coupled, and the long strings of "1"s and "0"s make DC restoring and equalizing of the channel signal for conversion to binary-digital very difficult or impossible.

From a frequency domain perspective, the scrambler acts to fill-in the broadband spectrum of the scrambled NRZI channel signal, making it more noise-like. However, despite the fact that the signal is referred to as digital, the channel signal actually is an analog signal with most of the traditional analog problems. This broadband signal should be presented to a receiver with nearly a flat frequency response for best reception. Therefore, since the transmission channel is coaxial cable with a frequency-dependent loss, an adaptive equalizer is used at the receiver to compensate for this loss. The equalizer restores the high-frequency components lost through the cable to prevent the less attenuated, low-frequency components from interfering with the attenuated high-frequency components. This is necessary to allow proper slicing of the signal voltage into the correct logic levels that the signal voltage represents.

In addition, since the low-frequency coupling is often not sufficient in practical systems, a DC restorer is also used. This is an important element since loss of these low-frequency components may be a cause of jitter in the received data. A diagram of a typical serial-digital transmitter, channel and receiver is shown in FIG. 1.

One final element is added to the channel coding, an NRZ to NRZI coder. This is a single-bit LSFR used to make the channel signal polarity independent. It is essentially a modulo-two accumulator where a logic "0" input causes no change in the output and a logic "1" input increments the output, causing it to change state. For example, a string of "1"s at the input causes an output of alternating "1" and "0" values. In this way the "1" and "0" data is communicated via the changes or transitions in the data or channel signal voltage as opposed to the actual values of the channel voltage. Since a change in the data from both a "0" to a "1" and a "1" to a "0" is detected as a logic "1", and the lack of a change as a logic "0", the polarity of the change is unimportant. Decoding the NRZI data back to NRZ is simply a matter of comparing the current data value with the immediately preceding value and, if they are different, output a "1" and, if they are the same, output a "0".

What is desired is an improved serial-digital receiver for extracting data from a transmitted data channel where the data is in NRZI format.

BRIEF SUMMARY OF THE INVENTION

Accordingly the present invention provides an improved serial-digital receiver having no DC restorer and an analog comb filter prior to a slicer and clock recovery circuit to decode NRZI data in the analog domain. An analog voltage signal from a transmission channel, after equalization but without DC restoration, is converted by a comb filter into a bi-polar or pseudo-ternary signal that Is input to the slicer and clock recovery circuit. The slicer and clock recovery circuit may be a pair of comparators having opposing voltage levels as references to which the bi-polar signal is input. The outputs from the comparators, one of which may be the recovered clock signal, are input to an OR gate to produce a scrambled NRZ string of "1"s and "0"s represented by the analog voltage signal transitions. The OR gate may be replaced by a sequential state machine decoder having as inputs the outputs from the comparators as Up and Down signals, which decoder also provides a single-bit error flag. In parallel with the decoder a "soft-decision" data recovery circuit may be used to indicate a probability of a bit error, which when coupled with the error flag identifies the particular bit where the error occurred. Then the probability error output may be used as part of an error correction circuit to correct the erroneous bit.

The objects, advantages and other novel features of the present invention are apparent from the following detailed description when read in conjunction with the appended claims and attached drawing.

DETAILED DESCRIPTION OF THE INVENTION

Figure 1:
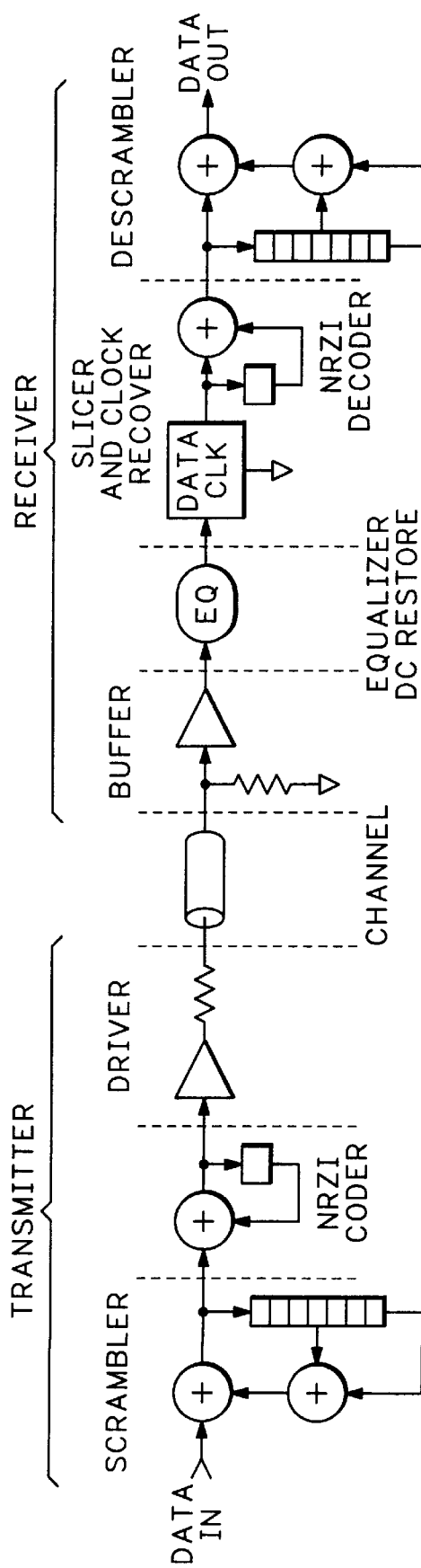
FIG. 1 is a block diagram view of a serial-digital system including transmitter, channel and receiver according to the prior art.
Figure 2:
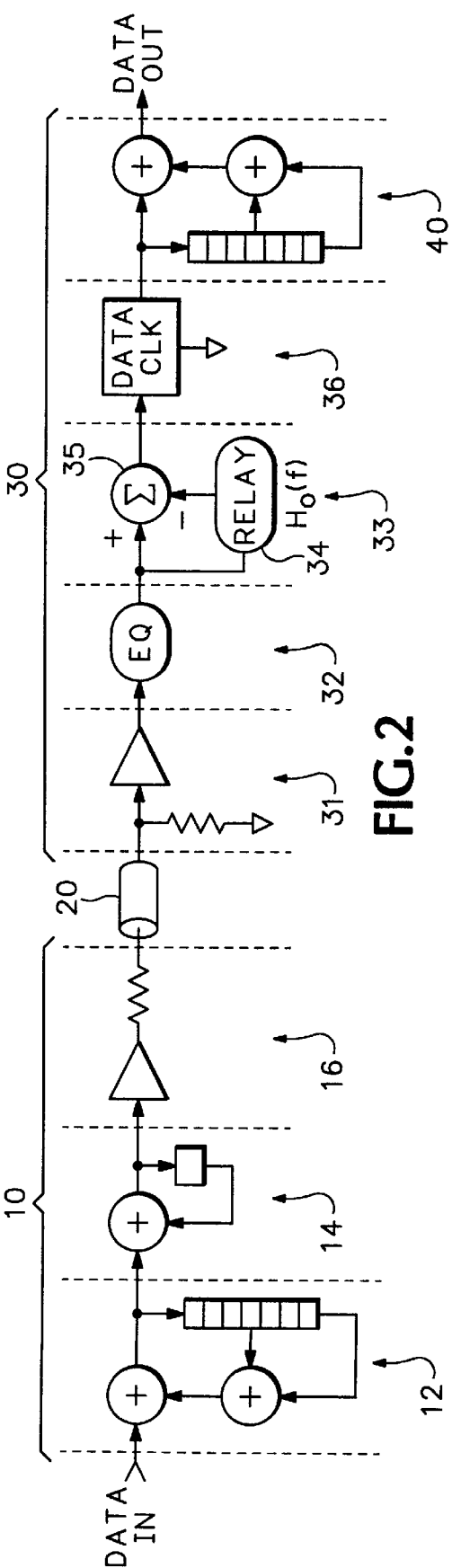
FIG. 2 is a block diagram view of a serial-digital system including transmitter, channel and receiver according to the present invention.
Figure 3:
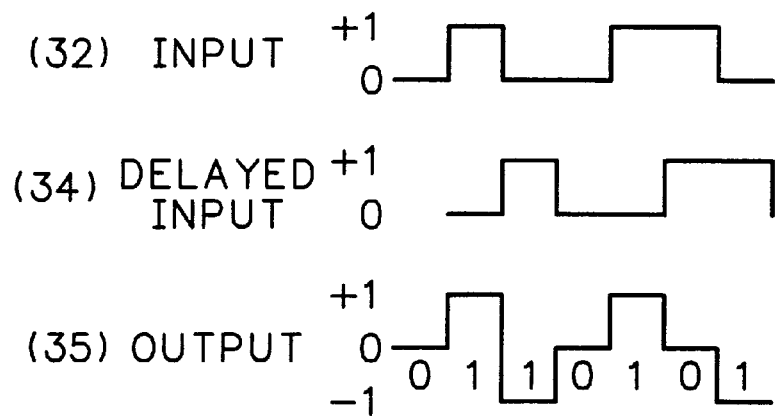
FIG. 3 is a timing diagram view for the serial-digital system of FIG. 2 according to the present invention.
Figure 4:
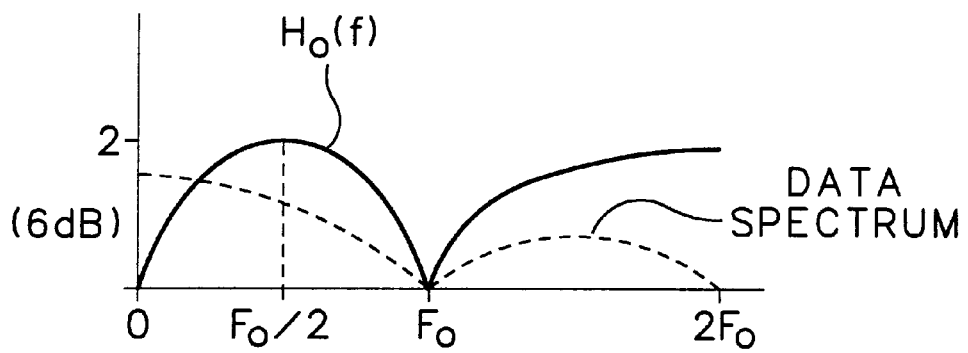
FIG. 4 is a spectrum diagram view for the serial-digital system of FIG. 2 according to the present invention.
Figure 5:
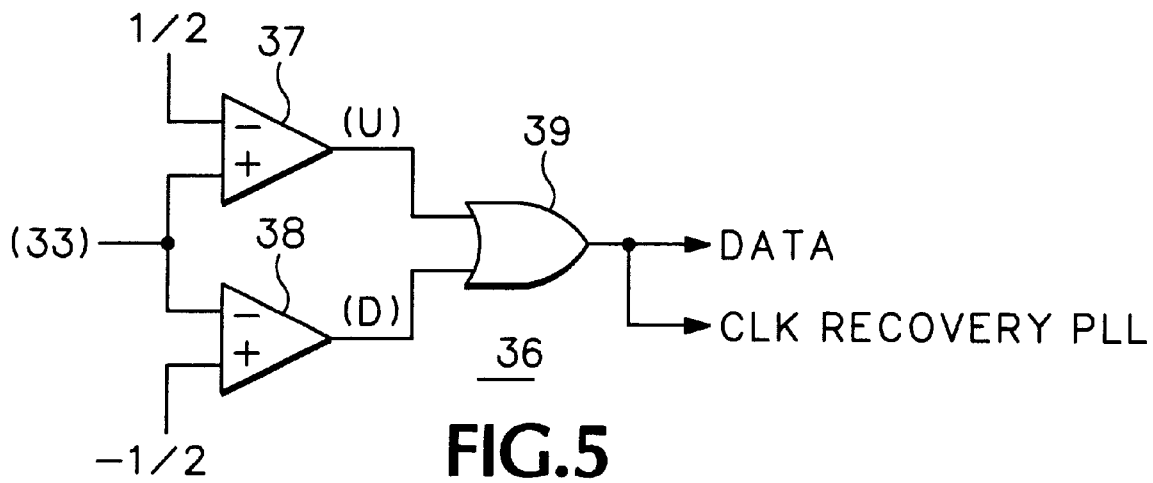
FIG. 5 is a block diagram view of a data and clock recovery circuit for the serial-digital system according to the present invention.

Referring now to FIG. 2 a serial-digital signal is input to a transmitter 10 having a scrambler 12, an NRZ to NRZI coder 14 and a driver 16 in series, as in the prior art. The ECL voltages from the driver 16 are input to a transmission channel 20, such as a coaxial cable. A receiver 30 receives the data from the transmission channel 20 via an input buffer 31, which is then input to an equalizer 32. The equalizer 32, contrary to the prior art, does not include a DC restore circuit. The output of the equalizer 32, which is a binary level voltage signal as shown in FIG. 3, is input to a comb filter 33 having a delay line 34 and a subtraction circuit 35 with a filter function Ho(f), as shown in FIG. 4. The delay of the delay line 34 is less than or equal to the reciprocal of the data rate of the serial-digital data with the optimum value being equal to the reciprocal of the data rate, i.e., for a 270 Mb/s serial-digital data system the delay is approximately 3 ns. The output from the comb filter 33 is a bi-polar or pseudo-ternary signal, as shown in FIG. 3, which is input to a slicer and clock recovery circuit 36. One such slicer and clock recovery circuit 36 is shown in FIG. 5 having a pair of comparators 37, 38 where the bi-polar signal is compared with plus and minus one-half of the equalized signal level. The outputs from the comparators 37, 38 are input to an OR gate 39 to recover the serial-digital data as "1"s and "0"s, which also is used to drive a clock recovery phase locked loop, as in prior art serial-digital receivers. However when the delay of delay line 34 is less than the reciprocal of the data rate, clock recovery is enhanced since the number of data transitions is doubled. The serial-digital data from the slicer and clock recovery circuit 36 is input to a descrambler 40 to recover the original data input to the transmitter 10 as data output.

Due to the NRZI pre-coding of the serial-digital channel data, the information in the transmission channel is conveyed via the changes, or transitions, or lack of changes in the channel voltage level. This rather heuristic interpretation implies that it is the high-frequency energy in the channel that conveys the information for decoding rather than the low-frequency energy. However in the prior art a receiver is needed to properly couple virtually all of the low-frequency energy into the slicer and clock recovery circuit, since this is the point where the equalized channel signal voltage is converted into the corresponding binary logic levels. The fact that the information is carried on logic differences is of no benefit since all the signal levels, even the ones that haven't changed for a long time, need to be properly converted to a logic "1" or "0" in order for the subsequent digital NRZI decoder to work without error. But the digital NRZI decoder of the prior art is a finite impulse response (FIR), linear state-machine over modulo-two. Therefore in the present invention comb filter 33 provides a similar linear FIR transversal filter function in the analog portion of the signal path prior to the slicer and clock recovery circuit 36, accomplishing NRZI to NRZ conversion there rather than on the digital binary data. In this way the channel signal is processed before conversion to digital, accomplishing the NRZI decoding or difference detection via an analog, high-pass filter and eliminating the need for low-frequency coupling or DC restoration. The comb filter 33 acts to reject the low-frequencies generated by the pathogenic or SDI signals. In other words, any string of "1"s or "0"s greater than the length of one sample interval is allowed to decay to zero since the output of the comb filter 33 is zero anyway. In this way the receiver characteristic is matched to the high-frequency component where the information is contained in the first place. Since the filter function is linear, a linear equalizer could be placed at the input or output or could be combined with the comb filter to equalize the cable attenuation rather than as shown in FIG. 2. For example a peak detector method may detect the comb filter output pulses and equalize only the output signal, simplifying the equalizer. Due to the lack of low-frequency energy at the output, no DC restorer is needed.

Following or preceding the comb filter 33 with an integrator or low-pass filter constitutes a matched filter for white noise. For this application the channel response is rolled-off by the cable loss and, since the equalizer peaks the noise spectrum at high frequencies, it is not white. Therefore the matched filter may be approximated by an RC roll-off at the comb filter output. The sampling of the comparator outputs in the slicer and clock recovery circuit 36 occurs at the end of the data interval, thereby more closely optimizing the signal to noise ratio (S/N) of the detector.

The bi-polar or pseudo-ternary output from the comb filter 33 is similar to the AMI (Alternate Mark Inversion) signal common in pulse code modulation (PCM). This is a consequence of the NRZI coder 14 in the transmitter 10 and the comb filter response Ho(f). The power spectrum of the signal into the slicer and clock recovery circuit 36 is then the sinc-squared spectrum of the NRZI signal, shown in FIG. 4, weighted or highpass filtered by the sine-squared comb filter response.

Figure 6:
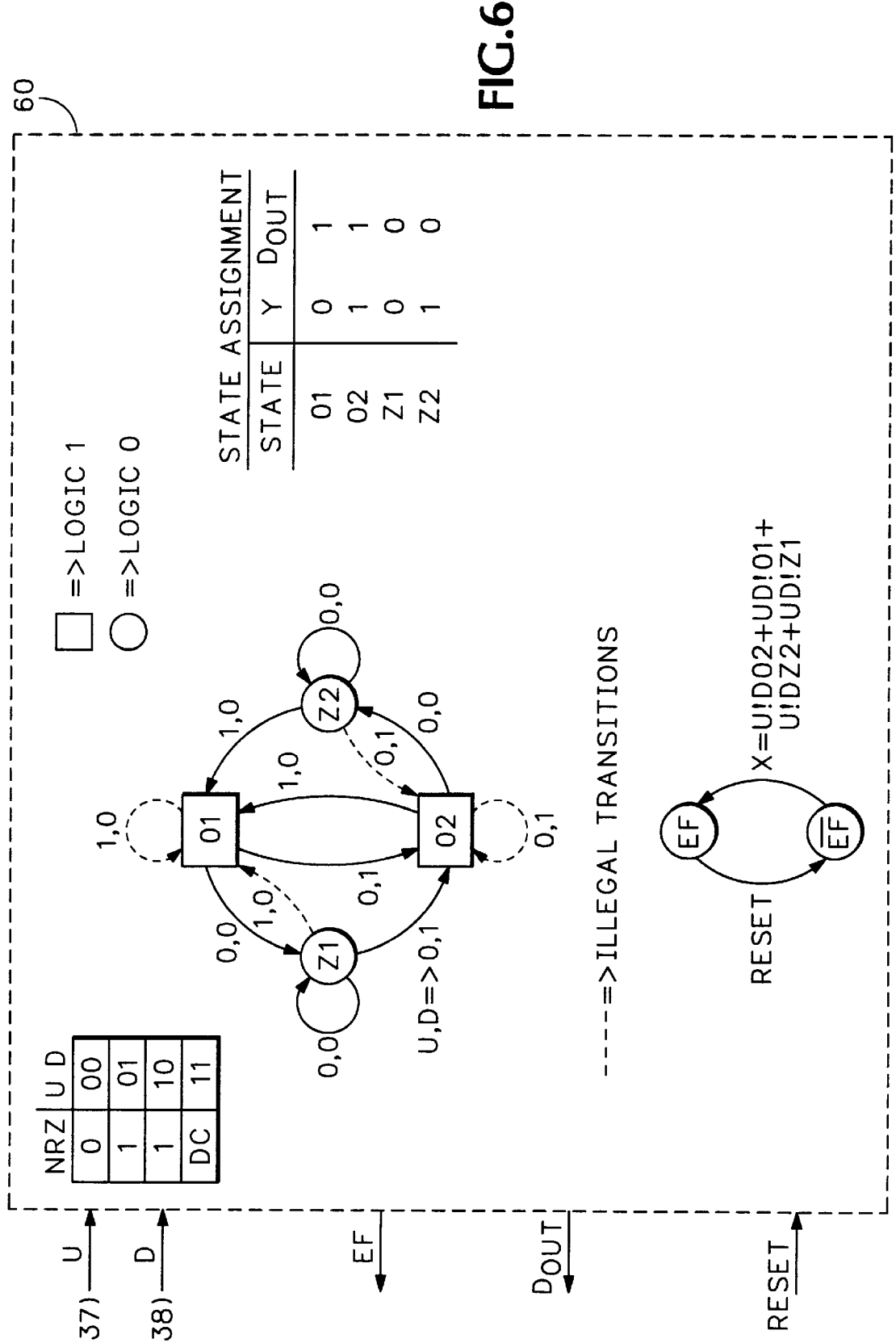
FIG. 6 is a state diagram view of a sequential state machine decoder for the serial-digital system including single-bit error detection according to the present invention.

The OR gate 39 in the slicer and clock recovery circuit 36 may be replaced by a sequential state machine decoder 60, as shown in FIG. 6, having as inputs the Up and Down binary signal outputs from the comparators 37, 38 in order to exploit the full information of the pseudo-ternary output from the comb filter 33. The decoder 60 is a sequential, data-converter that keeps track of the transition history and converts the two bits representing the three input levels to the original scrambled NRZ signal. Since the one-bit, binary NRZ data is now represented by three, two-bit binary values, the Hamming distance is increased and some error-detection is possible as some of the sequences of the two-bit output are not allowed and are only caused by level-detection errors, i.e., all single bit errors may be detected.

FIG. 6 shows a possible ECL, sequential state machine acting as the decoder 60 which also keeps track of the history of the state transitions and flags an error-bit for those that are not allowed. Looking at the output waveform of FIG. 3 the U,D bits for each time interval are, starting from (0,0), (1,0) (0,1) (0,0) (1,0) (0,0) (0,1). Transition sequences of (1,0) (0,0) (1,0), (1,0) (1,0), (0,1) (0,1) and (0,1) (0,0) (0,1) are not allowed because a positive transition (U=1) must be followed by a negative transition (D=1) before there can be another positive transition, and vice versa. Therefore state Z1 stores the fact that the prior transition was a positive transition, indicated by state O1, and state Z2 stores the fact that the prior transition was a negative transition, indicated by state O2. An error flag EF is set whenever from state O2 the next input is U!D (0,1), from state O1 the next input is UD! (1,0), from state Z2 the next input is U!D (0,1), and from state Z1 the next input is UD! (1,0). The error flag may be used by a host computer to indicate loss of data integrity as in a crash-point, early-warning detector. It also could enable a concealment filter for those cases where infrequent, data-dependent errors are occurring in the active video represented by the serial-digital data. U.S. Pat. No. 5,282,032 issued Jan. 25, 1994 to Daniel G. Baker entitled "Error Detection/Concealment for Serial Digital Video" illustrates one such concealment filter.

Figure 7:
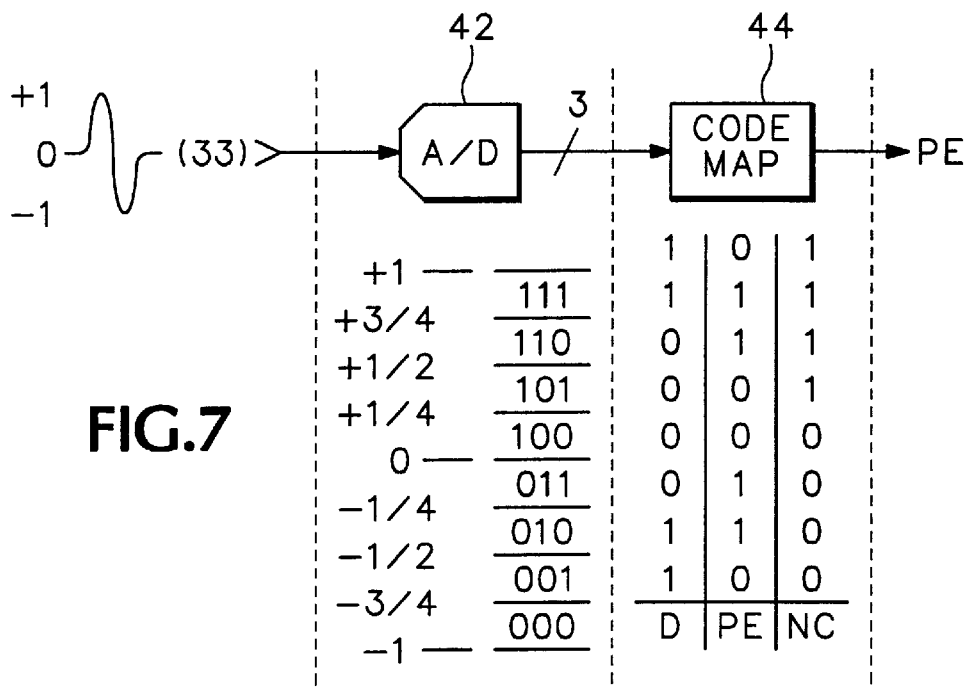
FIG. 7 is a block diagram view of a probability error detector for the serial-digital system according to the present invention.
Figure 8:
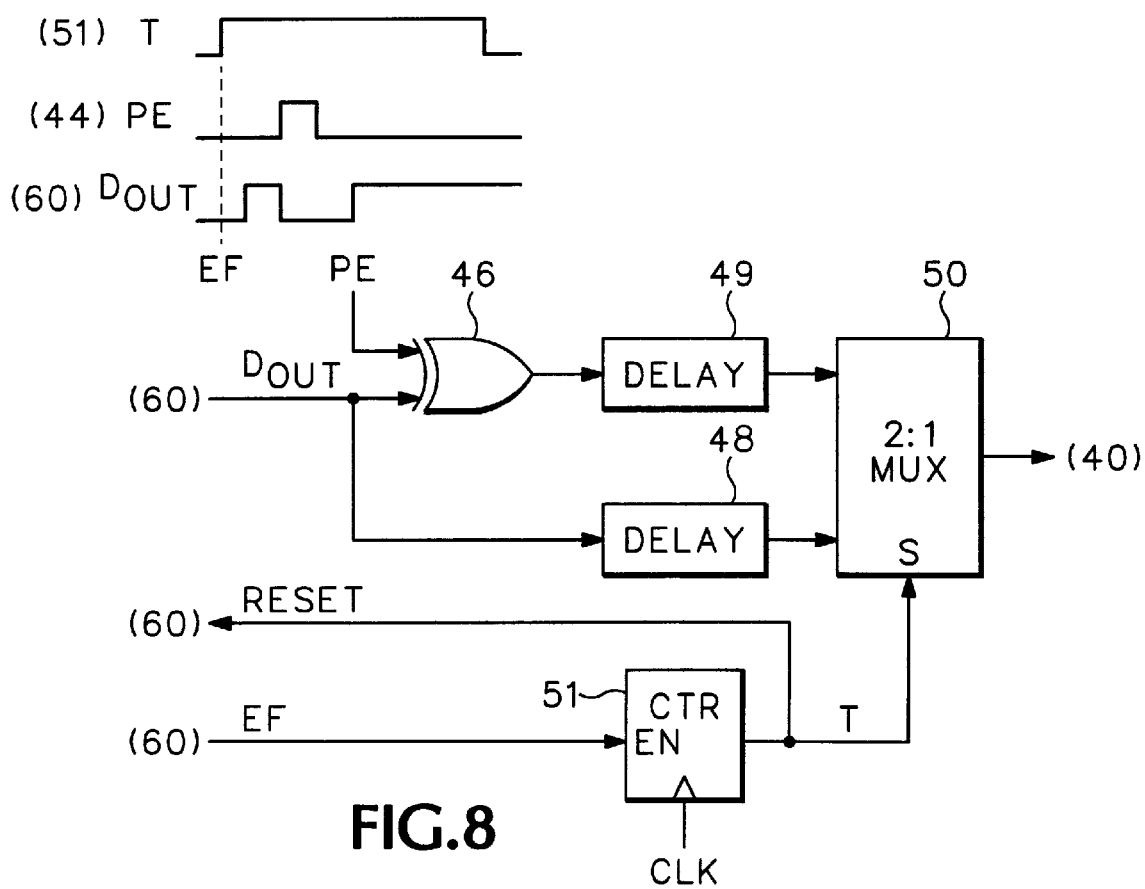
FIG. 8 is a block diagram view of a bit correction circuit according to the present invention.

To provide "soft-decision" data recovery the output from the comb filter 33 may also be input to a three-bit analog to digital converter (ADC) 42, or quantizer, to produce eight quantization ranges, and the three-bit output may be processed by a code map 44 to provide a bit that identifies bits that are probably error bits, as shown in FIG. 7. If the quantization level is either (111) or (000), the output data bit is a logic "1" with virtually no probability of an error; and if the quantization level is either (100) or (011), the output bit is a logic "0" with virtually no probability of an error. However if the quantization level is either (110) or (001), the output data bit is a logic "1" but there is a probability of an error, i.e., probable error signal (PE)=1; and likewise if the quantization level is either (101) or (010), the output data bit is a logic "0" but there is a probability of an error. By coupling the probable error signal from the code map 44 with the error flag from the sequential decoder 60 as the slicer and clock recovery circuit 36, the error flag serves to affirm that the probable error is in fact an error so that the bit associated with the probable error signal may be corrected using an exclusive OR gate 46, as shown in FIG. 8.

The EF signal sets a gate of a definite duration T, for example T=twenty bits in length for 10-bit data words in the serial-digital data, and if a PE flag occurs during that period, the particular bit that initiated the PE signal is determined in fact to be in error. The serial-digital data from the sequential decoder 60 is input to both a delay line 48 and the exclusive OR gate 46. The output from the exclusive OR gate 46 drives another delay line 49. The outputs from the delay lines 48, 49 are input to a switch 50 that is controlled by the error flag and counter 51. Where a bit error is confirmed, the partially corrected serial-digital output from the delay line 49 is output via the switch 50 to the descrambler 40 for a duration T determined by the counter 51; otherwise the serial-digital output from the delay line 48 is output to the descrambler. After the counter 51 is enabled by the EF signal, a RESET signal is returned to the sequential decoder 60, resetting EF at the end of the duration T.

Thus the present invention provides an improved serial-digital data receiver by performing NRZI to NRZ conversion in the analog domain, eliminating the need for a DC restorer, to produce a bi-polar or pseudo-ternary signal for slicing and clock recovery. The bi-polar signal is used to recover the data and embedded clock signal, and may also be used to flag single bit errors as well as to provide "soft decision" data recovery when bit errors occur.

What is claimed is:

1. An improved serial-digital data receiver of the type having a scrambled NRZI voltage signal input representing a serial-digital data signal input to a transmitter comprising:
   means for converting the scrambled NRZI voltage signal into a bi-polar voltage signal;
   means for extracting a scrambled NRZ data signal and a recovered clock signal from the bi-polar voltage signal; and
   means for descrambling the scrambled NRZ data signal to recover the serial-digital data signal.

2. The receiver as recited in claim 1 wherein the converting means comprises:
   means for delaying the scrambled NRZI voltage signal for a delay time less than or equal to one over the frequency of the recovered clock signal to produce a delayed scrambled NRZI voltage signal; and
   means for combining the delayed scrambled NRZI voltage signal with the scrambled NRZI voltage signal to provide the bi-polar voltage signal.

3. The receiver as recited in claim 1 wherein the extracting means comprises:
   means for comparing the bi-polar voltage signal with opposite polarity reference level voltages to produce a pair of digital data signals; and
   means for combining the pair of digital data signals to produce the scrambled NRZ data signal.

4. The receiver as recited in claim 3 wherein the combining means comprises means for detecting from the pair of digital data signals a single bit error in the bi-polar voltage signal to produce an error flag signal.

5. The receiver as recited in claim 4 further comprising:
   means for detecting a probable error condition in the bi-polar voltage signal; and
   means coupled between the extracting means and the descrambling means for correcting the single bit error in the scrambled NRZ data in response to the probable error condition and the error flag signal to produce a corrected scrambled NRZ data signal as the scrambled NRZ data signal for input to the descrambling means.

6. The receiver as recited in claim 5 wherein the correcting means comprises:
   means for inverting bits of the scrambled NRZ data to produce a partially corrected scrambled NRZ data signal; and
   means for selecting between the scrambled NRZ data signal and the partially corrected scrambled NRZ data signal as the corrected scrambled NRZ data signal in response to a select signal derived from the the error flag signal.

7. In a receiver a method of decoding a serial-digital data signal input to a transmitter from a scrambled NRZI voltage signal comprising the steps of:
   converting the scrambled NRZI voltage signal into a bi-polar voltage signal;
   extracting from the bi-polar voltage signal a scrambled NRZ data signal and a recovered clock signal; and
   descrambling the scrambled NRZ data signal to recover the serial-digital signal.

8. The method as recited in claim 7 wherein the converting step comprises the steps of:
   delaying the scrambled NRZI voltage signal by a delay time less than or equal to one over the frequency of the recovered clock signal to produce a delayed scrambled NRZI voltage signal; and
   combining the delayed scrambled NRZI voltage signal with the scrambled NRZI voltage signal to provide the bi-polar voltage signal.

9. The method as recited in claim 7 wherein the extracting step comprises the steps of:
   comparing the bi-polar voltage signal with opposite polarity reference level voltages to produce a pair of digital data signals; and
   combining the pair of digital data signals to produce the scrambled NRZ data signal.

10. The method as recited in claim 9 wherein the combining step comprises the step of detecting from the pair of digital data signals a single bit error in the bi-polar voltage signal to produce an error flag signal.

11. The method as recited in claim 10 further comprising the steps of:

detecting a probable error condition in the bi-polar voltage signal; and correcting between the extracting and descrambling steps, the single bit error in the scrambled NRZ data signal in response to the probable error condition and the error flag signal to produce a corrected scrambled NRZ data signal as the scrambled NRZ data signal for input to the descrambling step.

12. The method as recited in claim 11 wherein the correcting step comprises the steps of:

inverting bits of the scrambled NRZ data signal to produce a partially corrected scrambled NRZ data signal; and selecting between the scrambled NRZ data signal and the partially corrected scrambled NRZ data signal as the corrected scrambled NRZ data signal.

13. An improved serial-digital data receiver of the type having a scrambled NRZI voltage signal as input representing a serial-digital data signal input to a transmitter comprising:

a filter having the scrambled NRZI voltage signal as an input and producing a bi-polar voltage signal as an output;

a slicer and clock recovery circuit having the bi-polar voltage signal as an input and a scrambled NRZ data signal and a recovered clock signal as outputs; and a descrambler having the scrambled NRZ data signal as an input and producing the serial-digital data signal as an output.

14. The receiver as recited in claim 13 wherein the filter comprises:

a delay line having the scrambled NRZI voltage signal as an input and a delayed scrambled NRZI voltage signal as an output which is the scrambled NRZI voltage signal delayed by a time less than or equal to one over the frequency of the recovered clock signal; and a combiner having as inputs the scrambled NRZI voltage signal and the delayed scrambled NRZI voltage signal and having as an output the bi-polar voltage signal.

15. The receiver as recited in claim 13 wherein the slicer and clock recovery circuit comprises:

a comparator having as inputs the bi-polar voltage signal, a positive reference voltage and a negative reference voltage and producing as outputs a pair of digital data signals indicative of transitions in the bi-polar voltage signal and the recovered clock signal; and a combiner having as inputs the pair of digital data signals and producing as an output the scrambled NRZ data signal.

16. The receiver as recited in claim 15 wherein the combiner comprises an OR gate having the pair of digital data signals as inputs and the scrambled NRZ data signal as an output.

17. The receiver as recited in claim 15 wherein the combiner comprises a state machine having the pair of digital data signals as inputs and the scrambled NRZ data signal and an error flag signal indicative of a single bit error as outputs.

18. The receiver as recited in claim 17 further comprising:

a detector having as an input the bipolar voltage signal to produce a probable error condition indicator as an output; and a corrector coupled between the slicer and clock recovery circuit and the descrambler having as inputs the scrambled NRZ data signal, the probable error condition indicator and the error flag signal and producing as an output a corrected scrambled NRZ data signal for input to the descrambler as the scrambled NRZ data signal.

19. The receiver as recited in claim 18 wherein the detector comprises:

an analog to digital converter having as an input the bi-polar voltage signal and having as an output an n-bit quantized signal; and a mapping circuit having as an input the n-bit quantized signal and producing as an output the probability error condition indicator.

20. The receiver as recited in claim 18 wherein the corrector comprises:

a corrector having as an input the scrambled NRZ data signal and producing as an output a partially corrected scrambled NRZ data signal;

a switch having as inputs the scrambled NRZ data signal and the partially corrected scrambled NRZ data signal and providing as an output the corrected scrambled NRZ data signal selected from the scrambled NRZ data signal and the partially corrected scrambled NRZ data signal in response to a select signal; and a select circuit having as input the error flag signal and producing the select signal as an output.

21. A circuit for identifying single bit errors in a bi-polar voltage signal comprising:

means for comparing the bi-polar voltage signal with opposite polarity reference voltage levels to produce a pair of digital data signals representing transitions in the bi-polar voltage signal; and means for combining the pair of digital data signals to produce an error flag signal when the pair of digital data signals represents an illegal transition in the bi-polar voltage signal, the combining means being a state machine having the pair of digital data signals as inputs, the state machine having a first state indicating a positive transition above the positive reference voltage, a second state indicating a negative transition below the negative reference voltage, a third state indicating a transition from the positive transition to a zero state and a fourth state indicating a transition from the negative transition to the zero state, the state machine providing as an output the error flag signal when a transition from state one to state one is indicated, when a transition from state three to state one is indicated, when a transition from state two to state two is indicated and when a transition from state four to state two is indicated.

22. A method of indicating single bit errors in a bi-polar voltage signal comprising the steps of:

comparing the bi-polar voltage signal with opposite polarity reference level voltages to produce a pair of digital data signals representing the direction of transitions in the bi-polar voltage signal; and detecting as a function of the pair of digital data signals illegal transitions in the bi-polar voltage signal to produce an error flag signal using a state machine having the pair of digital data signals as inputs, the state machine having a first state indicating a positive transition above the positive reference voltage, a second state indicating a negative transition below the negative reference voltage, a third state indicating a transition from the positive transition to a zero state and a fourth state indicating a transition from the negative transition to the zero state, the state machine providing as an output the error flag signal when a transition from state one to state one is indicated, when a transition from state three to state one is indicated, when a transition from state two to state two is indicated and when a transition from state four to state two is indicated.

23. A circuit for identifying single bit errors in a bi-polar voltage signal similar to an alternate mark inversion data signal comprising:

a comparator having as inputs the bi-polar voltage signal and a pair of opposite polarity reference voltages, and producing as outputs a pair of digital data signals, one of the pair of digital data signals representing transitions above the positive one of the opposite polarity reference voltages and the other of the pair of digital data signals representing transitions below the negative one of the opposite polarity reference voltages; and a detector having as inputs the pair of digital data signals and providing as an output an error flag signal representing illegal transitions in the bi-polar voltage signal, the detector being a state machine having the pair of digital data signals as inputs, the state machine having a first state indicating a positive transition above the positive reference voltage, a second state indicating a negative transition below the negative reference voltage, a third state indicating a transition from the positive transition to a zero state and a fourth state indicating a transition from the negative transition to the zero state, the state machine providing as an output the error flag signal when a transition from state one to state one is indicated, when a transition from state three to state one is indicated, when a transition from state two to state two is indicated and when a transition from state four to state two is indicated.

24. A single bit error correction circuit for NRZ data represented by a bi-polar voltage signal comprising:

means for detecting a single bit error in the bi-polar voltage signal to produce an error flag signal and for detecting a probable error condition in the bi-polar voltage signal; and means for correcting the single bit error in the NRZ data as a function of the probable error condition and the error flag signal to produce corrected NRZ data.

25. The circuit as recited in claim 24 wherein the correcting means comprises:

means for inverting the NRZ data to produce partially corrected NRZ data; and means for selecting between the NRZ data and the partially corrected NRZ data as a function of a select signal derived from the error flag signal to produce the corrected NRZ data.

26. The circuit as recited in claim 24 wherein the detecting means comprises:

means for comparing the bi-polar voltage signal with a pair of opposite polarity reference voltages to produce a pair of digital data signals, one digital data signal representing transitions of the bi-polar voltage signal above the positive reference voltage and the other digital data signal representing transitions of the bi-polar voltage signal below the negative reference voltage;

means for combining the pair of digital data signals to produce the error flag signal when illegal transitions in the bi-polar voltage signal are indicated by the pair of digital data signals;

means for quantizing the bi-polar voltage signal to produce a quantized data signal; and means for analyzing the quantized data signal to indicate the probable error condition.

27. A method of single bit error correction for NRZ data represented by a bi-polar voltage signal comprising the steps of:

detecting a single bit error in the bi-polar voltage signal to produce an error flag signal;

detecting a probable error condition in the bi-polar voltage signal; and correcting the single bit error in the NRZ data as a function of the probable error condition and the error flag signal to produce corrected NRZ data.

28. The method as recited in claim 27 wherein the correcting step comprises the steps of:

inverting the NRZ data to produce partially corrected NRZ data; and selecting between the NRZ data and the partially corrected NRZ data as a function of a select signal derived from the error flag signal to produce the corrected NRZ data.

29. The circuit as recited in claim 27 wherein the single bit error detecting step comprises the steps of:

comparing the bi-polar voltage signal with a pair of opposite polarity reference voltages to produce a pair of digital data signals, one digital data signal representing transitions of the bi-polar voltage signal above the positive reference voltage and the other digital data signal representing transitions of the bi-polar voltage signal below the negative reference voltage;

combining the pair of digital data signals to produce the error flag signal when illegal transitions in the bi-polar voltage signal are indicated by the pair of digital data signals;

and wherein the probable error detecting step comprises the steps of:

quantizing the bi-polar voltage signal to produce a quantized data signal; and analyzing the quantized data signal to indicate the probable error condition.

* * * * *